United States Patent
Köppel et al.

(10) Patent No.: US 11,591,126 B2
(45) Date of Patent: Feb. 28, 2023

(54) METHOD AND APPARATUS FOR JOINING AT LEAST TWO PLASTIC PARTS

(71) Applicant: KOCHER-PLASTIK MASCHINENBAU GMBH, Sulzbach-Laufen (DE)

(72) Inventors: Karl Köppel, Rainau (DE); Frank Mark, Spiegelberg (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 129 days.

(21) Appl. No.: 16/768,999

(22) PCT Filed: Nov. 23, 2018

(86) PCT No.: PCT/EP2018/082381
§ 371 (c)(1),
(2) Date: Apr. 20, 2021

(87) PCT Pub. No.: WO2019/110328
PCT Pub. Date: Jun. 13, 2019

(65) Prior Publication Data
US 2021/0237922 A1 Aug. 5, 2021

(30) Foreign Application Priority Data

Dec. 7, 2017 (DE) ...................... 10 2017 011 354.8

(51) Int. Cl.
*B29C 65/14* (2006.01)
*B65B 51/10* (2006.01)
(Continued)

(52) U.S. Cl.
CPC .......... *B65B 51/10* (2013.01); *B29C 65/1412* (2013.01); *B29C 65/1448* (2013.01);
(Continued)

(58) Field of Classification Search
CPC ....... B65B 51/10; B65B 51/32; B65B 7/2878; B29C 65/1412; B29C 65/1448; B29L 2031/26; B29L 2031/7158
See application file for complete search history.

(56) References Cited

U.S. PATENT DOCUMENTS 5,151,149 A * 9/1992 Swartz ................ B29C 66/1122
156/499
5,928,453 A * 7/1999 Kawamoto ......... B29C 65/1467
156/309.9

(Continued)

FOREIGN PATENT DOCUMENTS

DE 197 19 363 11/1997
DE 20 2006 003 323 9/2006
(Continued)

OTHER PUBLICATIONS

International Search Report (ISR) dated Feb. 4, 2019 in International (PCT) Application No. PCT/EP2018/082381.

*Primary Examiner* — Daniel McNally
(74) *Attorney, Agent, or Firm* — Wenderoth, Lind & Ponack, L.L.P.

(57) ABSTRACT

A method for joining at least two plastic parts (1, 5) along a predeterminable common joining point using infrared radiation (IR), is characterized in that each of the plastic parts (1, 5) to be joined is heated using infrared radiation at least along the joint by radiation sources without touching the respective plastic parts (1, 5). One radiation source is operated independently and spatially separated from the other radiation source. The radiation sources emit their respective infrared radiation to the respective plastic parts (1, 5) without contact and following the contour of the joint. The degree of heating by the respective infrared radiation is selected such that the joint is formed when the plastic parts (1, 5) are brought together.

31 Claims, 5 Drawing Sheets

(51) Int. Cl.
    *B65B 7/28*         (2006.01)
    *B65B 51/32*      (2006.01)
    *B29L 31/26*      (2006.01)
    *B29L 31/00*      (2006.01)

(52) U.S. Cl.
    CPC ............ *B65B 7/2878* (2013.01); *B65B 51/32* (2013.01); *B29L 2031/26* (2013.01); *B29L 2031/7158* (2013.01)

(56) References Cited

U.S. PATENT DOCUMENTS

| | | | |
|---|---|---|---|
| 2002/0088541 A1 | 7/2002 | Nishikawa et al. | |
| 2003/0194226 A1* | 10/2003 | Miller | B29C 66/8242 |
| | | | 392/419 |
| 2005/0259433 A1* | 11/2005 | Nishizaki | B29C 65/1432 |
| | | | 362/520 |
| 2006/0127069 A1* | 6/2006 | Yamazaki | B29C 66/542 |
| | | | 392/419 |
| 2015/0118453 A1 | 4/2015 | Gotzelmann et al. | |
| 2015/0273808 A1 | 10/2015 | Thompson et al. | |

FOREIGN PATENT DOCUMENTS

| | | |
|---|---|---|
| DE | 10 2013 221 724 | 4/2015 |
| DE | 10 2014 114 379 | 4/2016 |
| DE | 10 2016 109 985 | 11/2017 |
| EP | 1 219 406 | 7/2002 |
| FR | 2 888 772 | 1/2007 |
| IT | PR20100094 | 6/2012 |
| WO | 2005/080067 | 9/2005 |

\* cited by examiner

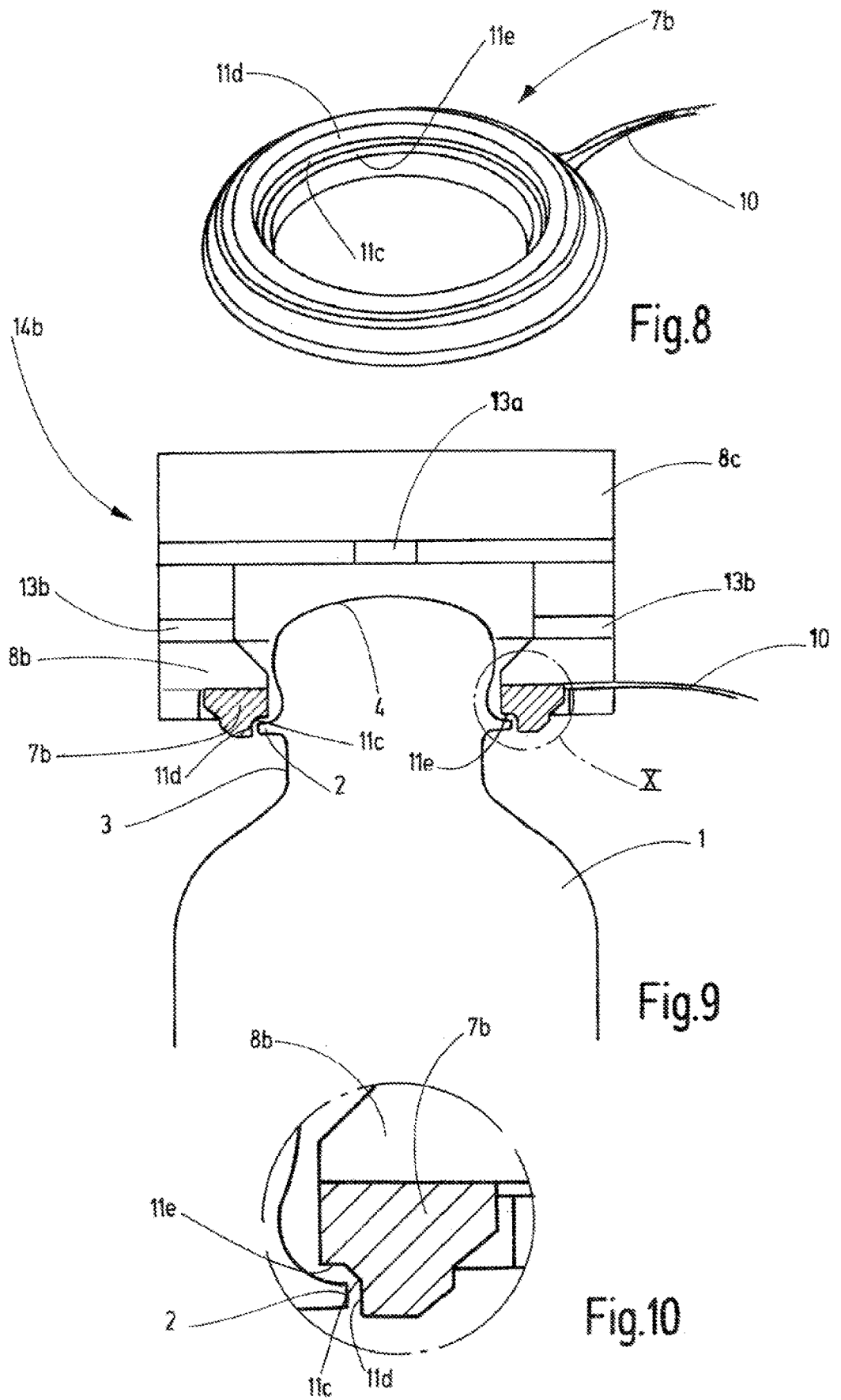

METHOD AND APPARATUS FOR JOINING AT LEAST TWO PLASTIC PARTS

FIELD OF THE INVENTION

The invention relates to a method for joining at least two plastic parts along a predeterminable common joining point using infrared radiation. The invention also relates to an apparatus for performing that process.

BACKGROUND OF THE INVENTION

In the manufacture of plastic containers for food, for cosmetics or for medical purposes, in particular parenterals or substances for parenteral nutrition, it is generally necessary to attach functional elements to the container concerned in a microbiologically sealed manner and avoiding particulate contamination. In the state of the art, sealed welded joints are produced for this purpose by using welding processes, for example vibration welding, friction welding or ultrasonic welding. However, the disadvantage of these welding processes is the generation of particles due to the friction that immanent in of the welding process. Contamination due to friction also occurs during hot-plate welding, known per se, when the components to be welded come into contact with the heating plate. Furthermore, this process can result in deposits being formed, which can strongly influence the welding quality.

WO 2005/080067 A2 discloses a welding method for joining plastic parts, in which the parts to be welded are brought into contact and then are heated using infrared radiation and are welded together. Because the parts to be joined are brought into contact with each other in a cold state, the risk of particle formation cannot be excluded in this case as well. Furthermore, the process shown in this document is limited to components of simple geometry. DE 20 2006 003 323 U1 discloses a further process for infrared welding of plastic parts. However, this process is limited to the spot welding of relatively thin, large-area parts only and does not allow a microbiologically sealed weld joint.

SUMMARY OF THE INVENTION

Based on this state of the art, the invention addresses the problem of specifying a method permitting the production of sealed welded joints of plastic parts without microbiological contamination and without the risk of particle formation.

According to the invention, this object is basically achieved by a process having, as an essential feature of the invention, each of the plastic parts to be joined being heated using infrared radiation at least along the joint using an assignable radiation source without touching the respective other plastic part. The respective one radiation source is operated independently and spatially separated from at least one further radiation source. The radiation sources emit their respective infrared radiation to the respective assignable plastic part without contact and following the contour of the joint. The degree of heating by the respective infrared radiation is selected such that the joint is formed when the plastic parts are brought together. Because heating is performed close to the contour of the joint, but without contact, parts having a special geometry can also be heated at the joint with a temperature that is optimal for the welded joint. When the parts are brought together, the welded joint is then formed without microbiological contamination and free of particles.

The connection point can be formed as a linear connection seam, and the respective plastic parts can be joined applying a predeterminable contact pressure on these parts.

Advantageously, the respective radiation source is formed by an IR radiation element. The IR radiation elements used are operated at different temperatures, preferably an element at temperatures of 380° C. to 480° C., particularly preferably 400° C. to 450° C., and a respective other element at temperatures of 450° C. to 600° C., particularly preferably 500° C. to 550° C., at a heating time to the respective plastic part of preferably approximately 4 seconds.

In this case, a cooling device is used to cool plastic parts that are heat-sensitive due to the material and/or geometry.

It is particularly advantageous when using the method according to the invention, that at least a plastic part is produced as a filled and closed container by a blow-molding, filling and sealing (BFS) process.

Advantageously, the filled container is closed by a head membrane and enclosed by a ring-shaped neck collar at its neck par. The collar is connected to a cap placed on the container on the side of its head membrane, forming the plastic part via a ring web of the cap along the connecting seam. The container is used as the other plastic part for the joining or welding process.

Particularly advantageously, a preferred spacing between the ring web of the cap and one assigned IR radiation element is selected to be between 0.2 mm and 0.6 mm. The spacing between the neck collar of the container and the other assigned radiation element is selected to be between 0.4 mm and 0.8 mm.

Preferably, the infrared radiation generated by the respective radiation sources is emitted broadband and multidirectional.

Particularly advantageously, the head membrane of the container is heated in a manner reducing the germ count, but without melting for joining cap and container.

The joining of cap and container is performed in a low-particle way advantageously by using different IR radiation sources or IR radiation elements.

The subject matter of the invention is also an apparatus for performing a process according to the invention, which is characterized in that the respective radiation source is formed by an IR radiation element arranged inside a respective heating element assigned. The beating element follows the contour of an assignable plastic part to be irradiated without contact.

The subject matter of the invention is further a container, which is preferably produced by a blow molding, filling and sealing (BFS) process and is connected to a cap using a method and/or an apparatus according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 8 is a perspective view of an infrared radiation element of a container heating element according to an exemplary embodiment of the invention;

FIG. 9 is a schematically simplified, side view in section of the container heating element containing the IR radiation element of FIG. 8 and of the upper part of the container of FIG. 2, the neck collar of which is exposed to the radiation of the IR radiation element according to an exemplary embodiment of the invention;

FIG. 10 is an enlarged partial side view in section of the area designated by X in FIG. 9;

DETAILED DESCRIPTION OF THE INVENTION

Figure 1:
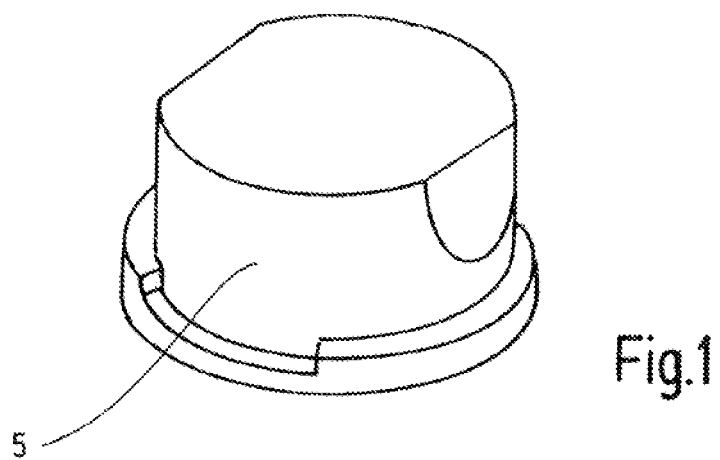
FIG. 1 is a perspective view of a plastic part in a principally schematic form of a cap according to the state of the art, which can be attached to the neck collar of a plastic container by welding.

With reference to the drawings, the invention is described in more detail by an exemplary embodiment, in which a cap 5, which is shown separately in simplified form in FIG. 1 and which is an infusion cap in accordance with DIN ISO 15759 made of plastic. Cap 5 is attached to the neck collar 2 of a container 1 by infrared welding. In this case, the container 1 is an infusion container having a head and neck area in accordance with DIN ISO 15759, which is manufactured, filled and sealed according to the known BFS procedure. The invention advantageously is equally applicable to the joining of different kinds of plastic parts by welding using infrared radiation.

Figure 2:
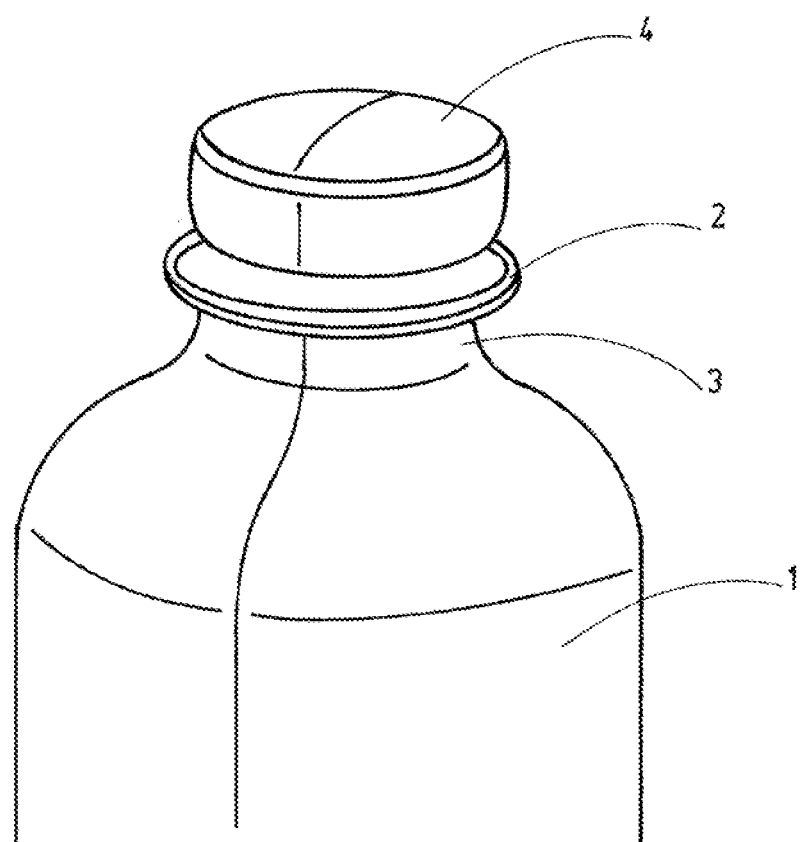
FIG. 2 is a partial perspective view of an infusion container according to the state of the art, to the neck collar of which the cap of FIG. 1 can be attached.
Figure 3:
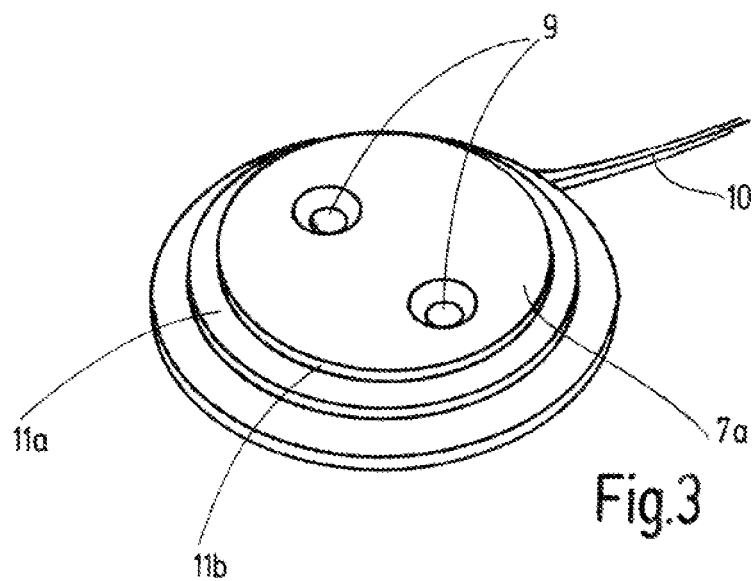
FIG. 3 is a perspective view of an infrared radiation element according to an exemplary embodiment of the invention.
Figure 4:
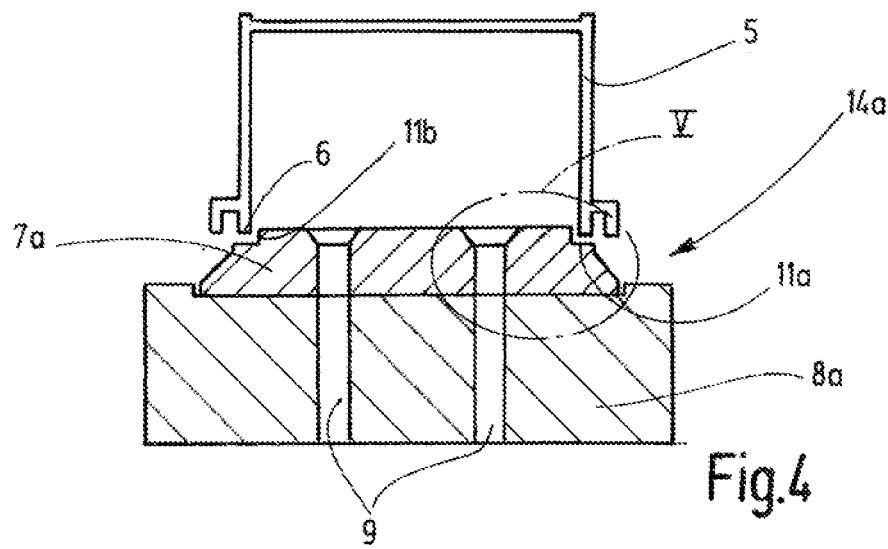
FIG. 4 is a side view in section of a cap heating element comprising the IR radiation element of FIG. 3 and the cap of FIG. 1 exposed to the radiation of the IR radiation element according to an exemplary embodiment of the invention.
Figure 5:
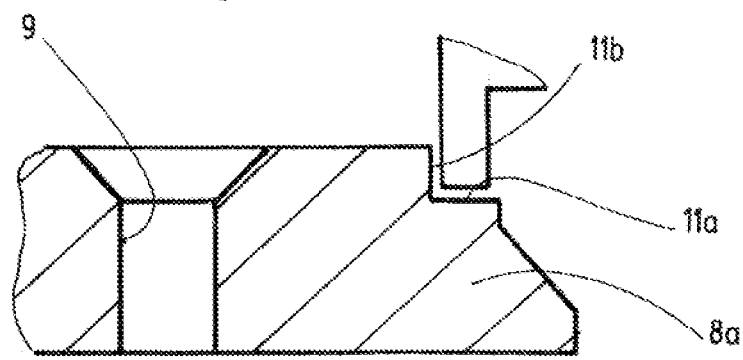
FIG. 5 is an enlarged partial side view in section of the area designated by V in FIG. 5.
Figure 6:
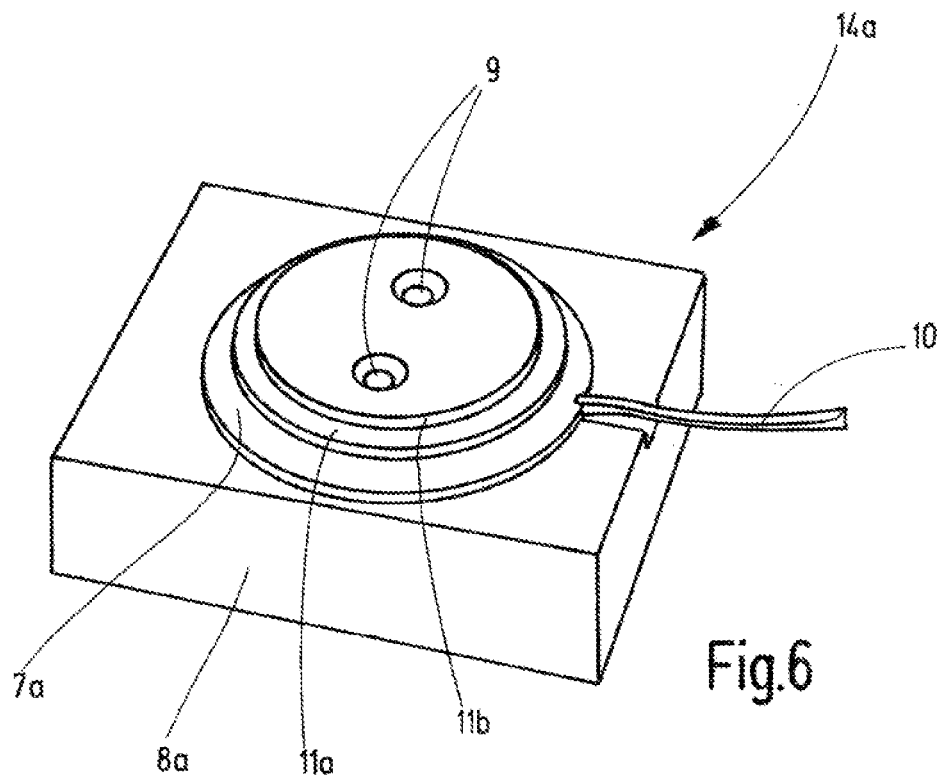
FIG. 6 is a perspective view of the cap heating element of FIG. 4, viewed in the direction of the IR radiation element.
Figure 7:
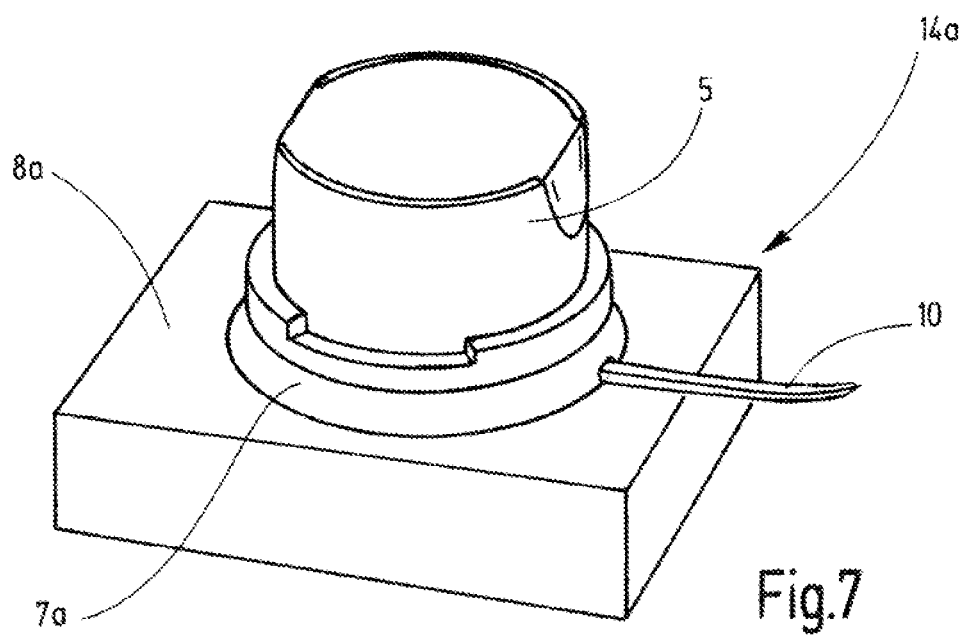
FIG. 7 is a perspective view corresponding to FIG. 6, but with the assigned cap of FIG. 1, which cap is to be exposed to IR radiation.

As most clearly shown in FIG. 2, the container 1 has a radially projecting neck collar 2 adjoining its container neck part 3. Neck collar 2 forms the joint on the container side for the welding process, to which joint, see FIG. 4, a ring web 6 projecting axially at the opening edge of the cap 5 can be welded. Web 6 forms the joint at the cap side. When the cap 5 is attached to this common joint, there is a thin and sensitive head diaphragm 4 forming the closure of the container 1 at the head side protected inside the cap 5. For the welding process, the cap 5 and the container 1 in the area of its neck collar 2 are each individually heated without contact to the welding temperature by infrared radiation. Therefore, for the cap 5, a cap heating element 14a, which is shown in FIGS. 4 to 7, is provided and has an IR radiation element 7a exposed at one end face. Radiation element 7a is attached to an insulation body 8a by drilled mounting holes 9 and can be supplied with power by an electrical connection 10. As most clearly shown in FIGS. 4 and 5, the IR radiation element 7a has the shape of a stepped cylindrical disc. For heating the ring web 6 of the cap 5 using IR radiation, cap radiation element 7a has two radiation surfaces 11a and 11b arranged in a stepped manner relative to one another. The radiation surface 11a forms a horizontal ring surface, while the radiation surface 11b forms a vertical ring surface. During the heating process, the cap 5, as FIGS. 4 and 5 show, is held such that the radiating surfaces 11a, 11b extend closely along the contour of the ring web 6, but are held by the ring web 6 without contact with cap radiation element 7a. The preferred spacing between the ring web 6 and the surfaces 11a, 11b of the radiating element 7a is 0.2 mm to 0.6 mm. FIG. 7 shows the arrangement of the cap 5 in this position on the cap heating element 14a.

Figure 12:
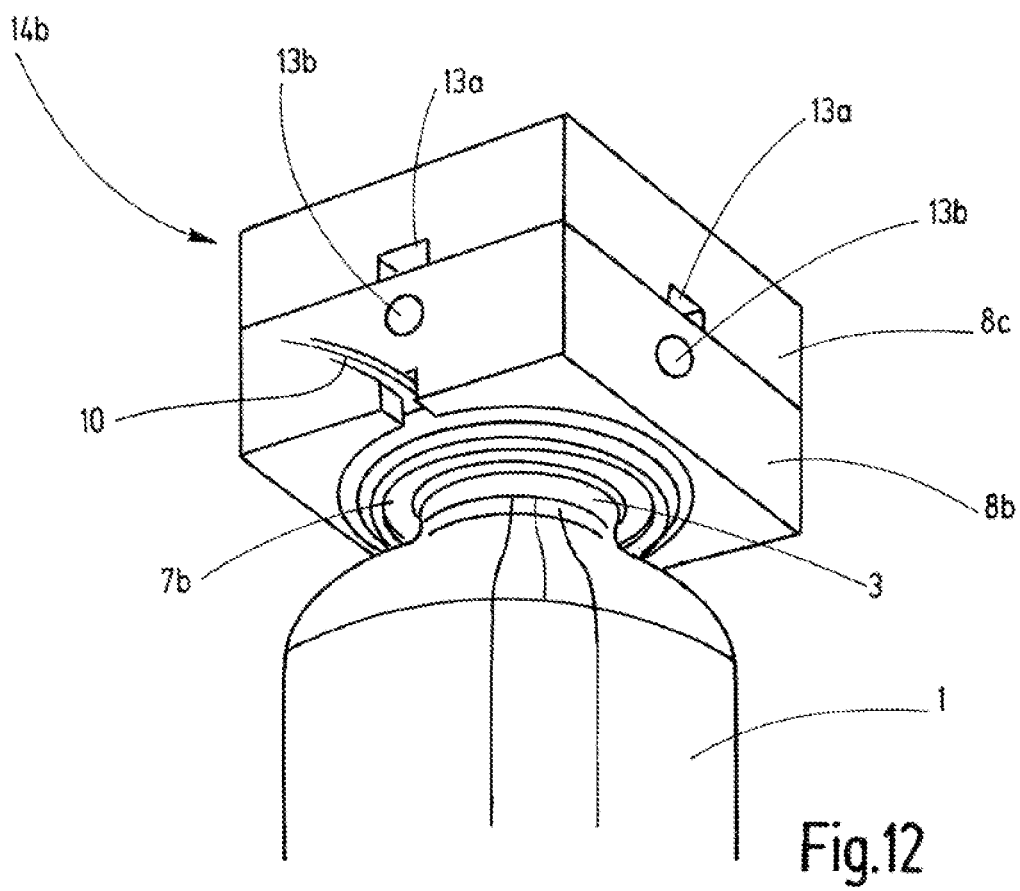
FIG. 12 a perspective view of the container heating element of FIG. 11 and the upper end area of the container of FIG. 2, which is exposed to IR radiation in the area of its neck collar.
Figure 11:
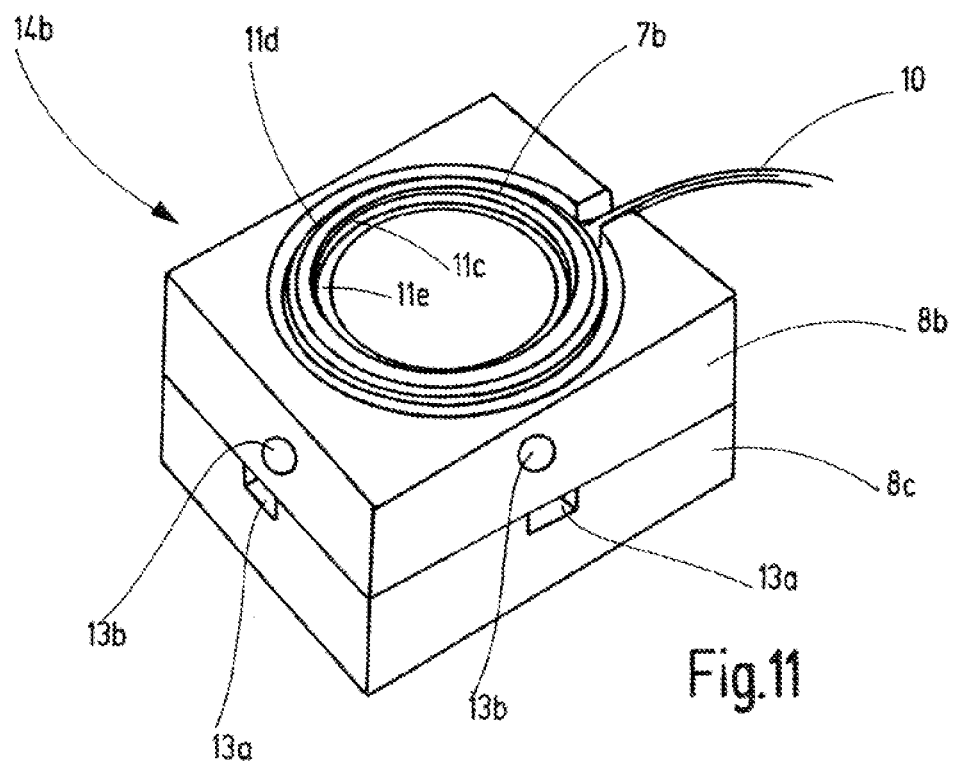
FIG. 11 a perspective view of the container heating element having the IR radiation element of FIG. 8, viewed in the direction of the IR radiation element.

FIG. 8 shows a separate illustration of a container IR radiation element 7b, that is attached to the free end face of a container heating element 14b for heating the container 1 at its neck collar 2 is shown in FIGS. 9 to 12. The IR radiation element 7b is provided for the container 1 and has the shape of a ring body having stepped inner surfaces forming radiating surfaces 11c, 11d and 11e. These radiating surfaces are held close to, but without contacting the contour of the area of the neck collar 2 of the container 1 during the heating process, as shown in FIG. 9 and most clearly in FIG. 10. As shown, the radiating surface 11e forms a horizontal ring surface. The radiating surface 11c forms a ring surface inclined at an angle of 45° relative to radiating surface 11c. The radiating surface 11d forms a vertical ring surface. As FIGS. 9, 11 and 12 show, the container heating element 14b has two insulation bodies 8b and 8c, of which the insulation body 8b has the form of an annular body, on which the IR radiation element 7b surrounds one ring opening and the other ring opening is closed by the other insulation body 8c, which forms an end plate. During the heating process, the IR radiation element 7b is held by the insulation body 8b to the neck collar 2 of the container 1 in a contact-free manner as shown in FIGS. 9 and 10. The head diaphragm 4 of the upper end part of the container 1 extends into the interior space formed by the insulation body 8b, which is closed at the top by the second insulation body 8c. As FIG. 9 shows, in this position the head diaphragm 4 is at a minimum spacing from the insulation bodies 8b and 8c, which is 5 mm, preferably 8 mm and particularly preferably 10 mm. The distance between the radiation surfaces 11c, 11d and 11e and the neck collar 2 is set to a minimum, typically in the range of 0.4 mm to 0.8 mm.

For the heating process, the IR radiating elements 7a and 7b are preferably set to different temperatures, which are in the range of 380° C. to 480° C. for the radiating element 7a and 450° C. to 600° C. for the IR radiating element 7b. The typical heating time is approx. 4 seconds. To only superficially heat the very thin, and thus, thermally sensitive head diaphragm 4 of the container 1 and in that way germ count reducing without causing any damage, for instance due to melting, when the neck collar 2 of the container 1 is heated, an active and controlled cooling of the head membrane 4 is performed by introducing of preferably sterile-filtered and low-particle cooling air as a cooling medium into the space between the insulation bodies 8b and 8c above the head membrane 4 via symmetrically arranged cooling air inlet channels 13b. The heated air is discharged via cooling air outlet ducts 13a, which are shown in FIGS. 9, 11 and 12, just like the inlet channels 13b. By supplying cooling air in a controlled manner, an advantageous surface temperature of the head diaphragm 4 of approx. 250° C. to 300° C. can be achieved for a short time during the operation of the IR radiating element 7b. In contrast to the heating element 14b for container 1, the heating element 14a for the cap 5 is not actively cooled or flushed. In this way, heating of the inner surface of the cap 5 is ensured, which also results in a reduction of germs on this surface.

While various embodiment have been chosen to illustrate the invention, it will be understood by those skilled in the art that various changes and modifications can be made therein without departing from the scope of the invention as defined in the claims.

The invention claimed is:

1. An apparatus for joining two plastic parts along a predeterminable common joining point using infrared radiation, the apparatus comprising:
ring-shaped first and second heating elements having first and second IR radiation elements being inside the first and second heating elements, respectively, and following contours of respective plastic parts to be irradiated without contacting the respective plastic parts, the first and second IR radiation elements being operable independently and being spatially separated from one another, each of the first and second radiation elements having first and second radiation surfaces oriented at an angle relative to one another, capable of generating and directing heat in different angular directions and capable of being parallel to joining surfaces of the respective plastic parts to be joined and oriented at angles relative to one another equal to the angle of the first and second radiation surfaces of the respective IR radiation element.

2. An apparatus according to claim 1 wherein the radiation surfaces of the first IR radiation element conform to a cap of a container and are arranged parallel to a direction of the cap is attached to the container and perpendicular to the direction the cap is attached to the container.

3. An apparatus according to claim 2 wherein the radiation surfaces of the second IR radiation element conform to a neck collar extending radially and horizontally to the container positioned vertically and are arranged parallel to a longitudinal axis of the container and horizontally and perpendicular to the longitudinal axis of the container, the second IR radiation element having a third surface connecting the other radiation surfaces of the second IR radiation element inclined at an angle to the longitudinal axis of the container.

4. An apparatus according to claim 3 wherein the third surface is inclined the angle of 45 degrees.

5. An apparatus according to claim 1 wherein the radiation surfaces of the second IR radiation element conform to a neck collar extending radially and horizontally to a container positioned vertically and are arranged parallel to a longitudinal axis of the container and horizontally and perpendicular to the longitudinal axis of the container, the second IR radiation element having a third surface connecting the other radiation surfaces of the second IR radiation element inclined at an angle to the longitudinal axis of the container.

6. An apparatus according to claim 5 wherein the third surface is inclined the angle of 45 degrees.

7. An apparatus according to claim 1 wherein the radiation surfaces extend continuously in annular and concentric manners about longitudinal axes thereof.

8. An apparatus according to claim 1 wherein the second heating element comprises an insulated holder having minimum distance of at least 5 mm from a head membrane of a container.

9. An apparatus according to claim 8 wherein the distance is at least 8 mm.

10. An apparatus according to claim 8 wherein the distance is at least 10 mm.

11. An apparatus according to claim 5 wherein the second IR radiation element comprises a cooler cooling a head membrane of the container and supplying cooling air to a cooling chamber being extendable over the head membrane and being capable of receiving the head membrane for at least one of cooling or heating the neck collar.

12. An apparatus according to claim 1 wherein the first and second IR radiation elements having removable first and second adjusters, respectively, adjusting positions of the first and second IR radiation elements relative to the respective plastic parts.

13. An apparatus according to claim 1 wherein the radiation surfaces are planar.

14. A method for joining first and second plastic parts along predetermined joining surfaces of the first and second plastic parts using infrared radiation, the method comprising the steps of:
using an apparatus for joining two plastic parts along the joining surfaces using infrared radiation, the apparatus comprising: ring-shaped first and second heating elements having first and second IR radiation elements being inside the first and second heating elements, respectively, and following contours of the joining surfaces of the respective plastic parts to be irradiated without contacting the respective plastic parts, the first and second IR radiation elements being operable independently and being spatially separated from one another, each of the first and second radiation elements having first and second radiation surfaces being oriented at an angle relative to one another and being parallel to the joining surfaces of the respective plastic parts to be joined and oriented at angles relative to one another equal to the angle of the first and second radiation surfaces of the respective IR radiation elements;
separately and independently heating the first and second plastic parts with the first and second IR radiation elements, respectively, generating and directing IR radiation in different angular directions along the contours of the joining surfaces of the first and second plastic parts without the first and second IR radiation element touching or contacting the first and second plastic parts, respectively, by infrared radiation to extents or degrees sufficient for forming a welded joint when the joining surfaces of the first and second plastic parts are brought together; and
contacting the respective joining surfaces of the first and second plastic parts together after the heating of the first and second plastic parts.

15. A method according to claim 14 wherein the second plastic part is a filled and closed container produced by a blow-molding, filling and sealing process.

16. A method according to claim 15 wherein the filled and sealed container is closed by a head membrane enclosed by a ring-shaped neck collar on a neck part of the filter and sealed container;
the first plastic part is a cap placed on the filled and sealed container on a side of the head membrane and joined to the neck collar along a connecting seam.

17. A method according to claim 16 wherein
the first IR radiation element is spaced by a distance of 0.2 mm to 0.6 mm from a ring web of the cap during heating of the cap before joining with the neck collar; and
the second IR radiation element is spaced by a distance of 0.4 mm to 0.8 mm from the neck collar during heating of the neck collar before joining with the cap.

18. A method according to claim 16 wherein
the infrared radiation generated by the second IR radiation element heats the head membrane in a manner reducing a germ count on the head membrane without melting the head membrane.

19. A method according to claim 16 wherein
the cap and the neck collar are jointed in a low-particle way.

20. A method according to claim 14 wherein
the first and second IR radiation elements are operated at different temperatures with a heating time of 2 to 6 seconds.

21. A method according to claim 20 wherein
the first IR radiation element is operated at a temperature of 380° C. to 480° C.; and
the second IR radiation element is operated at a temperature of 450° C. to 600° C.

22. A method according to claim 20 wherein
the first IR radiation element is operated at a temperature of 400° C. to 450° C.; and
the second IR radiation element is operated at a temperature of 500° C. to 550° C.

23. A method according to claim 20 wherein
the heating time is approximately 4 seconds.

24. A method according to claim 14 wherein
a cooling medium is applied by a cooler to heat-sensitive plastic parts that are not intended to be heated with the infrared radiation.

25. A method according to claim 24 wherein
the cooling uses a low-particle gas.

26. A method according to claim 25 wherein
the low-particle gas is a sterile-filtered gas.

27. A method according to claim 14 wherein
a joint is formed by as a linear seam with the first and second plastic parts by applying a contact pressure on the first and second plastic parts.

28. A method according to claim 14 wherein
the first and second IR radiation elements generate broadband and multidirectional infrared radiation.

29. A combination, comprising:
two plastic parts to be joined along a predeterminable common joining surfaces using infrared radiation; and
an apparatus including ring-shaped first and second heating elements having first and second IR radiation elements being inside the first and second heating elements, respectively, and following contours of the respective joining surfaces of the plastic parts to be irradiated without contacting the respective plastic parts, the first and second IR radiation elements being operable independently and being spatially separated from one another, each of the first and second radiation elements having first and second radiation surfaces being oriented at an angle relative to one another, generating and directing IR radiation in different angular directions and being parallel to the respective joining surfaces of the respective plastic parts to be joined and oriented at angles relative to one another equal to the angle of the first and second radiation surfaces of the respective IR radiation element.

30. A combination according to claim 29 wherein
the radiation surfaces and the joining surfaces extend continuously in annular and concentric manners about longitudinal axes thereof.

31. A combination according to claim 29 wherein
the radiation surfaces are planar.

* * * * *